METHOD AND APPARATUS FOR AUTOMATIC PHOTOMETRIC COLOR END POINT DETECTION OF TITRATION PROCESSES
Filed July 14, 1958 3 Sheets-Sheet 1
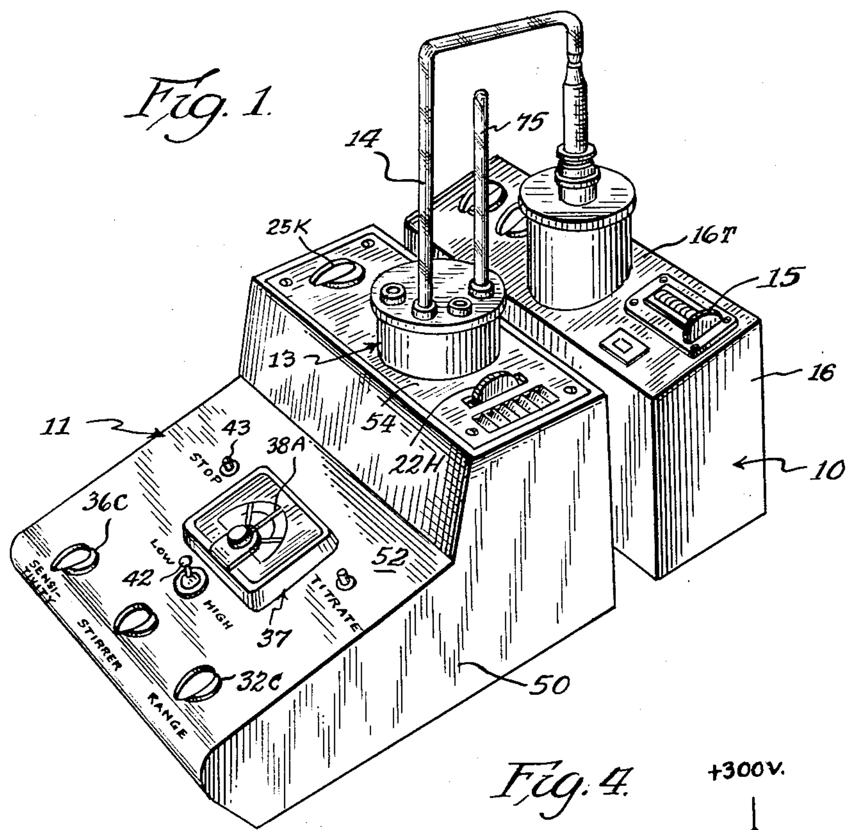
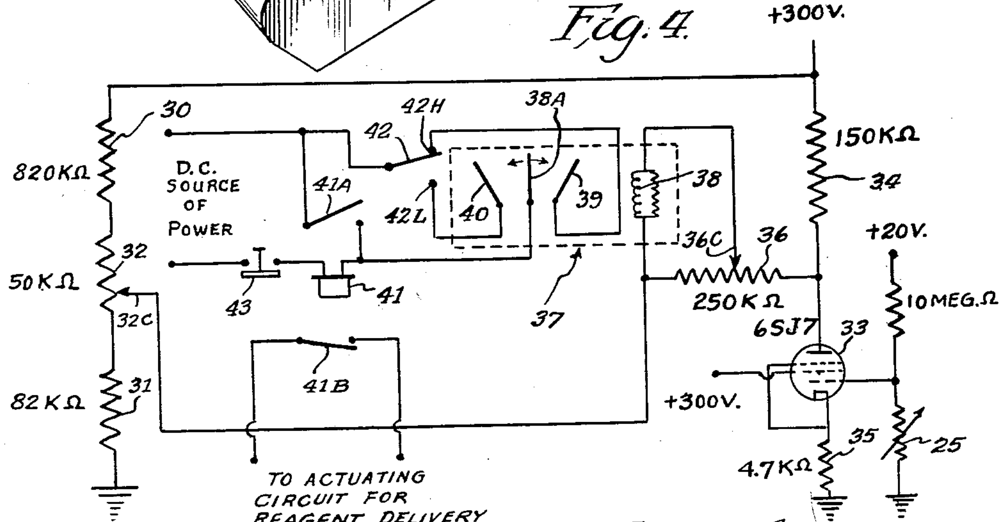
Inventors
David F. Hyde,
Conrad M. Jankowski,
Manning S. Reynolds and
James M. Thoburn
By Mann, Brown and McWilliams Attys.

March 20, 1962 C. M. JANKOWSKI ET AL 3,026,182
METHOD AND APPARATUS FOR AUTOMATIC PHOTOMETRIC COLOR END POINT DETECTION OF TITRATION PROCESSES
Filed July 14, 1958 3 Sheets-Sheet 2
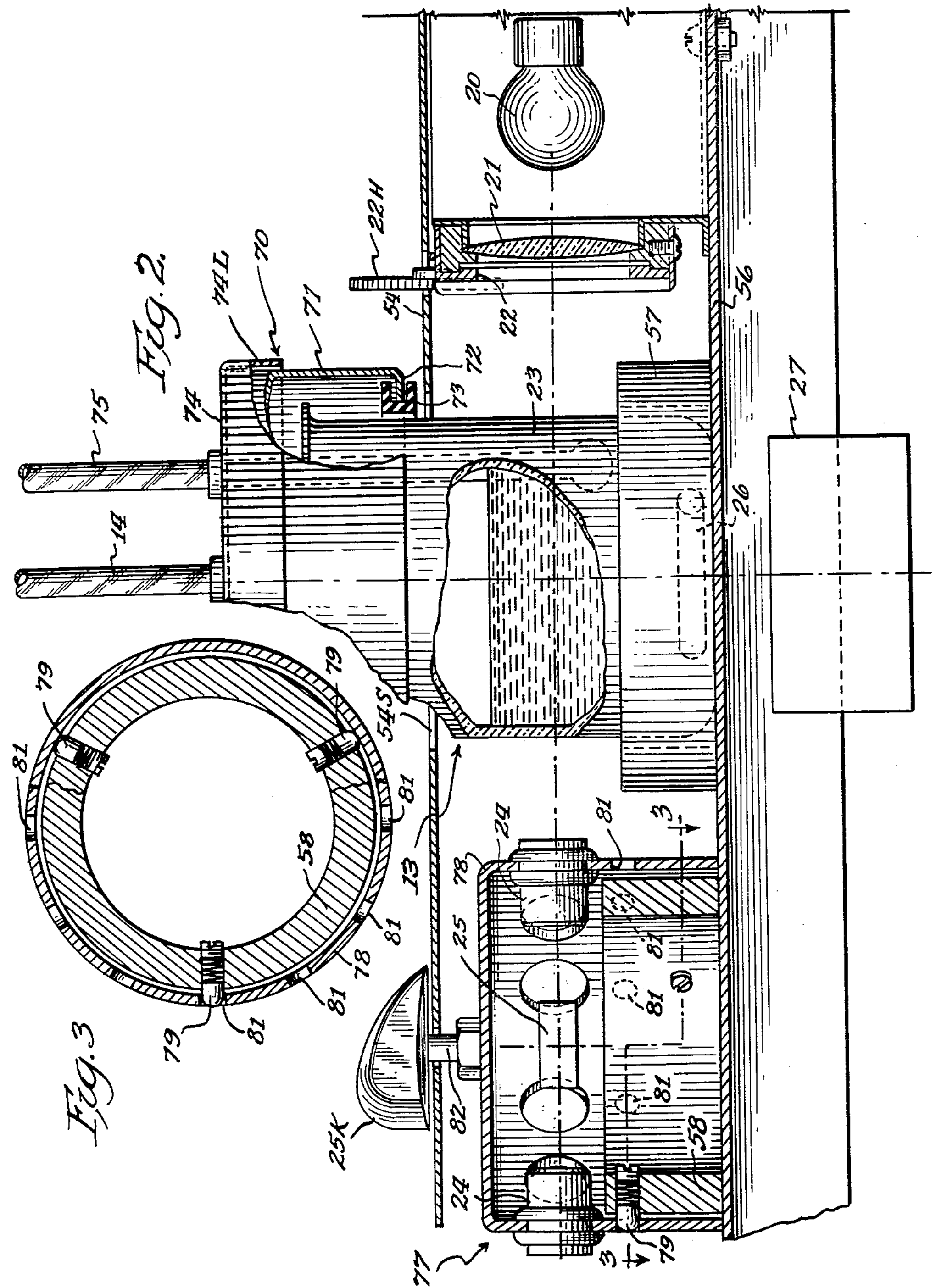

A
A
A
ABSORBANCE
BLANK TITRATION
FIRST TITRATION
SECOND TITRATION
E
E
MOLES OF REAGENT 54
53
52
59
59
55
50
67
68
51
56
60
65
62
63
64
66
67
61
67

United States Patent Office 3,026,182
Patented Mar. 20, 1962

3,026,182

METHOD AND APPARATUS FOR AUTOMATIC PHOTOMETRIC COLOR END POINT DETECTION OF TITRATION PROCESSES

Conrad M. Jankowski, Iowa City, Iowa, and David F. Hyde and Manning S. Reynolds, Chicago, and James M. Thoburn, Evanston, Ill., assignors, by mesne assignments, to Cenco Instruments Corporation, Chicago, Ill., a corporation of Delaware Filed July 14, 1958, Ser. No. 748,234
12 Claims. (Cl. 23—230)

This invention relates to a packaged commercial instrument and operational methods for use in conjunction therewith in providing a highly versatile and accurate automatic detection and cut-off of titrations and similar chemical processes.

Titrations have long been employed in the measurement of the unknown amount of a known substance, such measurement being arrived at by taking a measured amount of the unknown substance and adding a measured amount of a known reagent until a stoichiometric reaction is produced. The added amount of reagent must be accurately determined and the equivalence point or other selected end point must be accurately determined; and, until the present time, no practical commercial instrumentation has been available to the chemical laboratories for making such determinations. That there has long been a demand for such instrumentation is evidenced by the many homespun devices that have been constructed by individual chemists for use in their own specialized activities.

The various prior art attempts to provide automatically operable instrumentation for titration operations have been subject to one or more of the following limitations, which are given herein by way of illustrative example: (*a*) they have been overly dependent upon human reactions, both in the determination that the desired end point has been attained and in the determination of the amount of reagent that was added in reaching the end point; (*b*) they have lacked the versatility and adaptability that is so important to a successful commercial instrument that must serve a wide range of application of titration operations; (*c*) they have involved the use of expensive instruments designed for other work so that adaptation to end point detection is difficult and unreliable; and (*d*) in many instances, they have failed to properly conserve the chemist's time, a matter of serious concern in view of the demands on such talent in our expanding technology.

The principal object of the present invention is to provide automatic instrumentation in a unified and versatile instrument that finds practical application throughout a wide range of titration processes while preserving a high order of accuracy and reliability in the detection and indication of titration end points.

Another object of the invention is the provision of a method for operating such equipment utilizing a principle of successive titrations that permits of realizing the full performance capabilities of the instrumentation.

The invention teaches and makes use of the tremendous advantages afforded a commercial device embodying a system for photometric detection of the color changes that occur in the region of the titration end points. A vast number of chemical systems exhibit such color changes at their end points so that instrumentation which depends upon photometric end point detection provides a major range of application. The photometric system of detection is incorporated in a manner which gives desired versatility to the instrumentation in that it is useful in the titration of solutions of weak concentration where the inflection of a potentiometric end point detection system would be unduly limited; in that it is useful with solutions of high ionic strength in which case conductometric methods of end point detection are inadequate; and in that it avoids the introduction into the solution in the sample cell of electrodes or similar sensing equipment, and this is important in systems using coulometric addition of reagent since potential interference between the generation and detection portions of the system is avoided.

To adapt the photometric system of detection to the full potential of its range of application, the instrument of this invention provides an optical system having a photo-sensitive detector, an adjustable iris for regulating the intensity of the monitoring light beam that impinges upon the photo-sensitive detector, and a plurality of selectively usable light filters for matching with the optical transmission characteristics of the various different solutions to be analyzed; and the invention also provides a novel electrical control and indicating system selectively actuated by the electrical response of the photo-sensitive detector and including a versatile meter-relay arrangement having selectively adjustable visible contacts cooperating with a movable contact arm in simplifying the initial adjustment of the equipment in preparation for any given titration process. This meter-relay arrangement also importantly enhances the reliability and accuracy of the detection of the desired end point.

The apparatus includes various other adjustments for facilitating its initial setup and use and also for protecting the sensitive components of this equipment.

Another object of the invention is to provide apparatus of the above type in combination with an automatic motor-driven syringe unit for the accurate volumetric delivery of reagent, with the syringe unit having a mechanically actuated electrical counter for presenting a digital representation of the amount of reagent added.

A further object is to provide automatic end point detection apparatus for use in conjunction with coulometric generation of reagent.

Other objects and advantages will become apparent during the course of the following description.

In the accompanying drawings forming a part of this specification and in which like numerals are employed to designate like parts throughout the same:

FIG. 1 is a diminutive perspective view of the end point detection instrument of the invention in association with a motor-driven syringe unit, with the instrument including means responsive to color changes in the region of the end point for automatically cutting off the supply of reagent from the syringe unit;

FIG. 2 is an enlarged front sectional illustration of the optical system employed in the instrument, with parts thereof broken away and sectioned for completeness of disclosure.

FIG. 3 is a detailed sectional view of the construction of the filter turret and is taken approximately along the line 3—3 of FIG. 2;

FIG. 4 is a diagrammatic illustration of the circuit connections of the electric control circuit for the optical system and for the reagent-delivery system;

Figure 6:
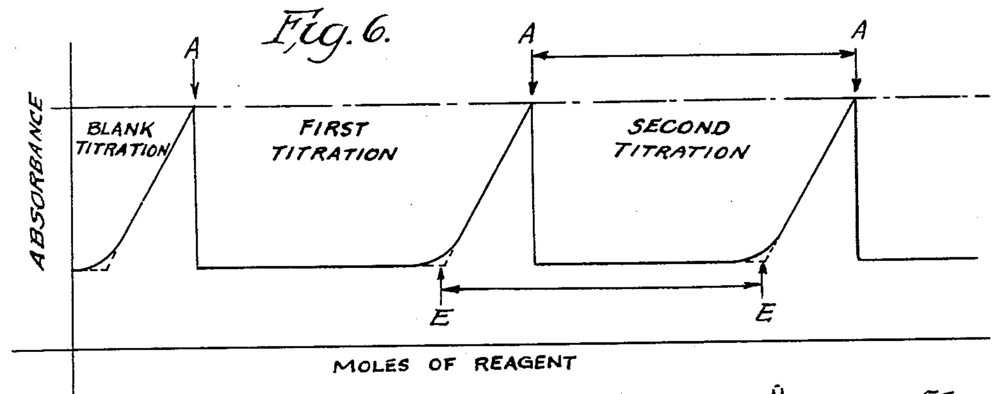
FIG. 6 is a graphical illustration of a method of successive titrations illustrating the preferred manner of operating the instrument of this invention.

Referring now to the drawings, and particularly to FIG. 1 thereof, the photometric titration end point detector unit of this invention is indicated at 11 and is shown in operative association with a motor-driven syringe unit 10 that includes supply tubing 14 arranged for supplying reagent to the titrator unit and that includes facilities operated by automatic controls of the titrator unit for automatically terminating delivery of reagent. The motor-driven syringe unit 10 is preferably of the type described in copending application Ser. No.

748,233, filed July 14, 1958, now Patent No. 2,966,175, in the name of David F. Hyde, and the disclosure of this application, to the extent it is not inconsistent herewith, is specifically incorporated by reference.

The titrator unit includes a sample cell 13 which receives a given volume of the unknown liquid sample, and the syringe unit 10 delivers a measured volume of reagent to the cell 13 for reaction with the sample until a stoichiometric end point is achieved. The determination that the reaction has reached an end point is made photometrically, and the optical system, for this purpose, is housed within the titrator unit, as will be described in more detail hereinafter.

It is a feature of this invention that the syringe unit 10, which is combined with and automatically controlled by the titrator unit, delivers a measured volumetric supply of reagent at a constant rate, with the measured volume of such reagent being recorded on an electric impulse type counter 15 that is conveniently visible through the top panel 16T of the syringe unit's housing 16. This counter provides a convenient digital presentation of the volume of liquid reagent delivered from the syringe unit to the sample cell 13. As is explained more fully in the aforesaid application, the electric impulse type counter 15 is in series-circuit relation with a mechanically operated switch that is motor driven simultaneously with the syringe mechanism, and this arrangement gives excellent accuracy.

It will become apparent that the titrator unit of this invention, when combined with an automatic reagent-delivery system, requires but a minimum of attention on the part of the operator. It is merely required that the operator set up the instrument, making such adjustments as are appropriate for the sample to be titrated. From this point, it will operate fully automatically in supplying and recording the amount of reagent added to the sample cell and in terminating the supply of reagent upon the attainment of the selected end point condition. The chemist need not interrupt his other activities while the titration is in process, and the volume of reagent that is added is indicated in the form of a convenient digital presentation which may either be directly recorded for subsequent evaluation of results or which may immediately be referred to a suitable calibration chart for determining the exact delivered quantity of reagent. This silent laboratory assistant thus satisfies an important and growing demand by performing titrations with a minimum of supervision and with a degree of accuracy and reliability that is difficult to equal with human skill alone.

The heart of the instrument of this invention resides in a simplified photometric detection system that monitors the light-transmittance characteristics of the liquid sample. By way of illustrative disclosure, the physical arrangement and details of construction of a preferred optical arrangement for the photometric detection of color changes is shown in FIG. 2. The detection system comprises a light source 20, a condensing lens 21, an adjustable iris 22, a cylindrical sample cell beaker 23, a color filter 24, and a photo-sensitive detector 25 arranged in successive collinearly spaced relation so that the iris, the beaker and its sample solution, and the light filter successively intercept the light impinging upon the photo-sensitive detector 25. The beaker and sample solution develop a certain focusing action, and the detector 25 is located near the point of convergence of the light after passage through the sample cell. The light intensity may be controlled as required simply by adjusting the iris 22, and the system includes an indexed selection of filters 24 which cover any desired range of the spectrum.

Stirring is preferably accomplished by a magnetic stirring rod 26 disposed in the bottom of the beaker 23 for actuation by a magnetic stirrer, which is disposed beneath the beaker as indicated diagrammatically at 27 in FIG. 2. In the illustrated arrangement, the photosensitive detector 25 is a C1–2 cadmium sulfide cell which acts as a photo-conductive element.

The function of the optical system is quite simple. When the sample solution in the beaker 23 is titrated to an end point and undergoes a change in transmittance, for example, a decrease in transmittance, the light impinging upon the photo-sensitive detector 25 is correspondingly decreased, with the result that its resistance increases, and this increase in resistance is reflected in an electric control circuit that is shown in FIG. 4 and will be described in more detail hereinafter. By way of example, assuming a solution is to turn a predominantly red color as it is brought to its end point, the filter for such a titration is preferably selected to exclude all light energy, except in the spectral region absorbed by the red solution. Thus, prior to the end point, the solution and filter will pass light energy at regions of the spectrum other than the red region; but at the end point, the solution, being red, will exclude all energy except that at the red region, which, in turn, is excluded by the filter. Thus, the photo-sensitive detector sees a decrease in radiation energy.

It should be noted that this photometric system of detection accomplishes its detection function merely by determining that a change in the transmittance of the sample solution has occurred at the chosen or relevant wave length. Thus, the present invention does not require the sensitive and refined components commonly employed in spectrophotometers such, for example, as linear amplifiers, narrow beam monochrometers, reproducible slit width mechanisms, matched detector cells, etc. It should also be apparent that interference such as might be caused by color-absorbing foreign substances in the sample solution will not impair photometric detection since such interference will be constant throughout the titration process. In extreme cases, compensation may be effected by increasing the intensity of the light source or selecting a filter of different transmittance characteristics, as required.

The instrument of this invention employs a novel electric circuit arrangement for responding to changes in the electrical condition of the photo-sensitive detector 25 resulting from color changes or changes in the light-transmittance characteristics of the sample solution in the region of the end point of a titration process and for correspondingly controlling the delivery system to terminate supply of reagent immediately upon the attainment of the selected end point condition. The accuracy and reliability of the instrument is dependent only upon a proper detection of the end point condition upon the immediate termination of the supply of reagent, and upon the accuracy of measurement of the volume of reagent applied.

In the preferred arrangement, the circuit for responding to electrical changes in the photo-sensitive detector 25, as illustrated in FIG. 4, takes the general form of a Wheatstone bridge in which resistors 30 and 31 are interconnected by a range potentiometer 32 having an adjustable contact arm 32C dividing two of the arms of the bridge, with the plate-to-cathode circuit of a vacuum tube 33 having a plate resistor 34 and a cathode resistor 35 providing matching arms that complete a balanced circuit. The bridging or null arm of the circuit includes the adjustable contact 32C and a sensitivity potentiometer 36, one end of which is connected to the plate of tube 33 to define the matching arms. According to the preferred form of the invention, the actual operating function is performed by a meter relay designated generally as 37, which includes an operating coil 38 connected in series with the contact arm 36C of the sensitivity potentiometer 36 that is adjustable to regulate the shunting, and hence the sensitivity of the meter relay. The photo-sensitive detector 25, being a photo-conductive element, is arranged in a voltage-divider network having a tapped connection to the grid of tube 33 such that the voltage across the photo-sensitive detector cell 25 determines the grid voltage, and, hence, the plate-current conduction of the tube 33.

It will be assumed that the circuit is initially balanced and that a titration is to be performed wherein the sample liquid undergoes a decrease in transmittance at the end point region. In this event, the decrease in transmittance causes the photo-sensitive detector 25 to see less light, and its resistance increases correspondingly to cause an increased voltage drop across the detector cell. This increase in voltage drives the grid of the tube 33 in a positive direction, allowing more current to flow in the plate-to-cathode circuit so that the apparent resistance of the lower arm of the bridge decreases to cause an unbalance in the bridge arrangement. The bridging arm, which includes the operating coil 38 of the meter relay, conducts current in response to this unbalance and appropriately actuates a swingably mounted, movable contact arm 38A that is visible on the face of the meter relay 37 (see FIG. 1).

The meter relay includes adjustable high-range and low-range contact arms 39 and 40 arranged for cooperation with the movable contact arm 38A in a separate control circuit for exciting a relay 41 that has a normally open "hold" contact 41A and a normally closed contact 41B, with the normally closed contact 41B being connected in a further control circuit that is plugged into and controls the operation of the delivery mechanism or system which, in this case, is illustrated as the motor-driven syringe unit. A push button 43 is provided for manually de-energizing relay 41 after a titration is completed. The two adjustable arms of the meter relay are provided for accommodating both the type of titration which has an end point region characterized by an increase in transmittance, in which case arm 39 would be operative and a selector switch 42 is engaged with a high-range contact 42H, and the type of titration which has an end point region characterized by a decrease in transmittance, in which case adjustable arm 40 cooperates with the arm 38A and the selector switch is engaged with the low-range contact 42L.

To a skilled operator, the movements of the externally visible contact arm 38A convey an intelligence concerning the end point characteristic of the particular sample under consideration. This is valuable in facilitating initial adjustment of the device and in insuring reliable detection of the end point condition. Both the range and rapidity of movement of this arm provide meaningful information. The meter arm also indicates the status of titrations after cut-off, a helpful feature in noting false or fading end points. It should be apparent that the more constant is the rate of delivery of reagent, the more meaningful are these movements of the meter arm 38A, and since the motor-driven syringe unit 10 of the aforementioned application is capable of delivering reagent at a constant rate, the full potential of the meter relay is realized when the titrator unit is associated with this syringe unit. It will also be apparent that coulometric reagent-delivery systems, though lacking the general versatility of the syringe-delivery system, also offer the advantage of supplying reagent at a constant rate. In fact, solenoid-operated burets may also be arranged to substantially conform to this function, and all such systems are contemplated within the broader aspect of the teachings and purposes of this invention.

While accuracy and reliability are of utmost importance and are adequately provided in the particular combination of the photometric end point detection system of FIG. 2 and the electrical circuit arrangement of FIG. 4, probably the most significant feature of the instrument of this invention is its versatility of application. The photometric detection system, particularly when associated with a motor-driven syringe unit, finds application in the vast majority of common titration processes and, in fact, offers certain advantages over specialized systems even in those limited areas in which the specialized systems find particular use. To achieve the desired versatility, this invention provides numerous adjustments to compensate for the many variables encountered. In certain titrations, the transmittance characteristics of the sample may undergo an extreme change at the end point region, whereas in other titrations only a very slight change will occur. The changes in each instance may involve different regions of the spectrum and may be increases or decreases in transmittance. Obviously, therefore, the photosensitive cell will see a number of quite different radiation characteristics when it is subjected to its full range of chemical processes. Not only must the instrument be adaptable to compensate the variable conditions it meets, but the required adjustments involved in adapting the instrument should be simple and easy to effect in order to avoid undue loss of time in setting up the instrument for each different titration.

Towards this end, the adjustable iris 22 is provided for varying the intensity of the monitoring light beam, and an indexed selection of filters 24 is provided for selecting any appropriate region of the spectrum, and these adjustments will be understood by those skilled in the art and will become progressively simplified as familiarity with this instrument increases. It will be apparent that the initial electrical condition of the cell 25 is likely to be somewhat different in the case of the various types of titrations, and, hence, its effect upon the Wheatstone bridge circuit will also be somewhat different. The range potentiometer 32 of the Wheatstone bridge arrangement provides a simplified means for bringing the bridge into balance after the optical system has been preliminarily adjusted. The fact of the attainment of a balanced condition is readily observed by watching the indicating arm 38A on the face of the meter relay. In some instances, the initial setup of the optical system may be such that the range adjustment cannot properly balance the bridge circuit, in which case it is merely necessary to adjust the iris and/or alter the filter selection while observing the indicating arm 38A. During the initial setup procedure, the sensitivity potentiometer may be adjusted to partially shunt the operating coil 38 of the meter relay for protecting it while permitting it to indicate the circuit condition during the initial adjustment.

There is one final adjustment procedure; namely, the system must be checked to ascertain that the change in the electrical condition of the photo-sensitive detector 25, in response to the solution passing through its color change at the end point region of the titration, will be of sufficient magnitude to move the indicating arm 38A into contact with one of the adjustable contact arms 39 or 40 so that the change in transmittance at the end point will actually effect an automatic cut-off of the reagent-delivery system. This phase of the adjustment can only be determined with certainty by running the system through an end point and observing the action of the meter arm. If the swing of the meter arm is too great or too small, the sensitivity and/or the range adjustment may be appropriately varied. In any case, it is preferable that the adjustable contact arm be set for engagement with the movable indicating arm 38A at the stage of most rapid movement of this arm. This arrangement gives the sharpest cut-off and the most accurate results.

The operation and setup procedures for the instrument of this invention will be generally apparent from the foregoing description, and certain aspects will become more clear in connection with the following disclosure of a preferred titration method that is employed with this equipment in accordance with this invention. The method consists of running a series of consecutive or successive titrations with each titration being run to an arbitrary end point not necessarily the stoichiometric end point but which is identical in each case. The method is described in connection with the graphical illustration of FIG. 6, the ordinate of which represents the absorbance of the solution in the sample cell, and the abscissa of which represents the moles of reagent delivered to the cell.

The true equivalence point for a particular titration is, for purposes of illustration, indicated at E, and the factor which is to be determined is the number of moles of reagent that are required for bringing a given unknown sample to the equivalence point. According to the method of the invention, for the example selected, successive titrations are run wherein the arbitrary end point is, as indicated at A, somewhere beyond the true equivalence point or stoichiometric end point and preferably at a point on the curve where the rate of change of the transmittance is a maximum. In the example shown, the point A is termed a "post equivalence end point" but it is obvious that in other types of titrations a "pre-equivalence end point" could be used. This corresponds to the range where the indicating arm of the meter relay undergoes its most rapid movement.

It will be apparent from a consideration of the example illustrated by FIG. 6 that the quantity of moles between adjacent arbitrarily selected, identical post-equivalence end points (A—A) is equal to the number of moles between adjacent equivalence or stoichiometric end points (E—E), and it should be equally apparent from the nature of the transmittance curve that greater accuracy can be expected in operating between the post-equivalence points, though there are certain dilution adjustments that should be considered and corrected, if necessary, by virtue of the fact that the overall volume of the solution increases slightly with each successive titration.

By way of illustrative example, the method is explained in connection with a titration of sodium oxalate with potassium permanganate. Such a titration would be carried out as follows: (1) 150 ml. of water are added to the beaker 23; (2) a blank titration with potassium permanganate is carried to an arbitrary end point which, in accordance with the method of this invention, is, in this example, a post-equivalence point as indicated at A; (3) a sample of sodium oxalate is added to the beaker; (4) a first titration with permanganate is run to an identical post-equivalence end point condition; and (5) additional titrations of similar character may be run, if desired, as indicated in FIG. 6.

It should be apparent that there is particular advantage in employing this successive titration technique with an arbitrarily selected end point where the rate of change of absorbance or transmittance is pronounced, since the circuit adjustments and meter arm adjustments are most easily correlated with operation in this range of the transmittance curve, and this not only facilitates initial adjustment but it improves the repeatability and accuracy of the instrument's performance.

It will be understood by those skilled in the art that the blank titration is a desirable preliminary step for eliminating any reactive material that may initially reside in the sample cell liquid and by watching the end point characteristics this blank titration conveys information to the operator that allows certain final adjustments to be made for adapting the instrument for operation at its point of optimum performance.

*Mechanical Arrangement*

Figure 5:
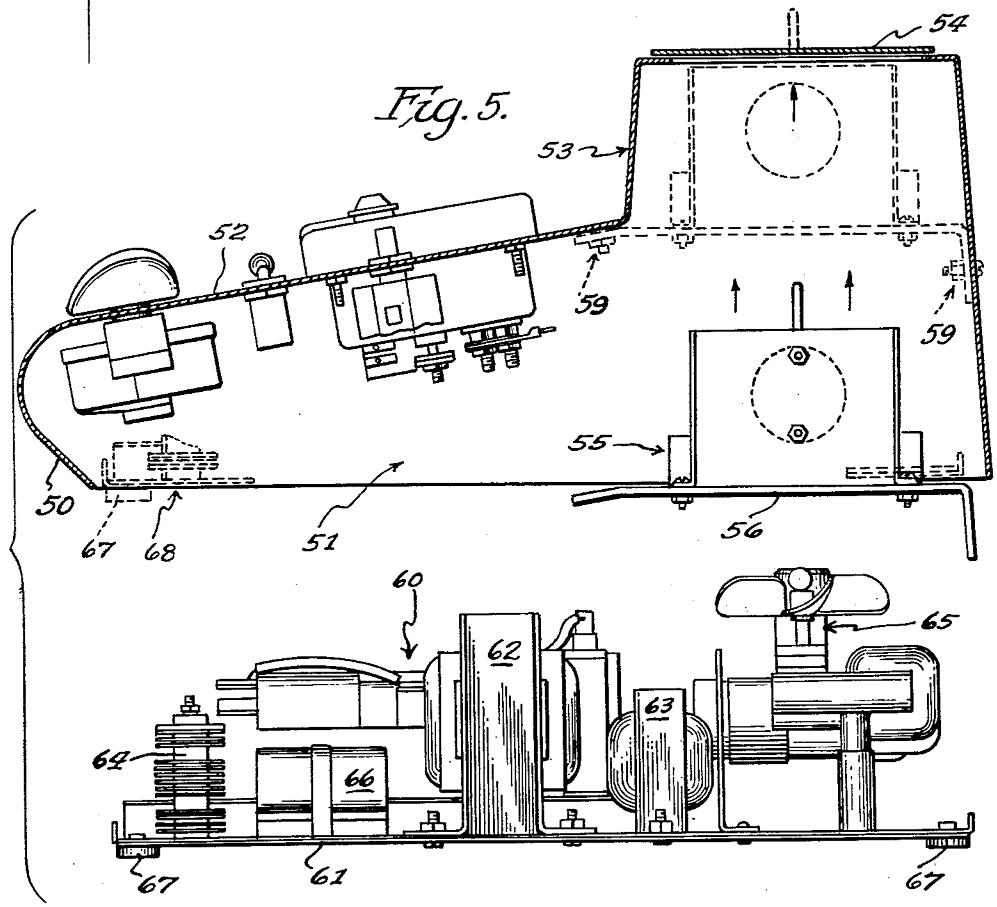
FIG. 5 is an exploded view of the chassis arrangement of the invention.

The titration end point detector unit of this invention is embodied in a convenient and attractive package which, as is best seen in FIG. 5, includes a main housing 50 forming an open-bottomed mounting chamber 51 for receiving the various components of the equipment, with the housing including an inclined control panel 52 and an upstanding hood 53 at the remote edge of the control panel. The control panel is arranged to receive the meter relay 37 and the various electrical control switches, and the hood includes a removable upper panel 54 (see FIG. 2) having an access opening 54S for the reception of the sample cell 13 and having appropriate openings for the iris handle 22H and a filter selector knob 25K.

The optical system is mounted on an optical chassis 55 in the form of a base plate 56 which includes a stationary ring 57 that forms a mounting well for the sample cell and another stationary ring 58 that forms a mount for a novel turret assembly that accommodates a plurality of filters in a compact, readily operable, indexing arrangement. The optical chassis also supports the light source 20 and the photo-sensitive detector unit 25, and suitable connection lines (not shown) extend from these devices for connection to appropriate electrical supply circuits. In FIG. 5 the optical chassis, as shown in full lines, is being inserted upwardly through the mounting chamber for nesting within the hood of the main housing. Suitable fastener facilities 59 are provided for securing the optical chassis in its ultimate mounting location within the hood, as indicated in dotted lines in FIG. 5.

Finally, the instrument includes a power chassis 60 having a main base plate 61 that supports the various power supply equipment of the end point detection unit, such equipment including the transformers 62 and 63, the rectifier 64, and other similar circuit devices and connection terminals that are not visible in the view of FIG. 5. The power chassis also supports the various components of the equipment that is controlled by the switches of the indicator panel. Such equipment includes a motor-fan unit 65 that is disposed immediately beneath the light source 20, the magnetic stirrer 27, indicated diagrammatically in FIG. 2, the numerous circuit components including the filter capacitor 66 and the vacuum tube 33. Many of these components are not visible in FIG. 5. The power chassis is shown in position for receiving the main housing, which is telescoped over the power chassis after the optical chassis is fixed in position. The base plate 61 preferably carries resilient corner feet 67 for supporting the entire unit. The mounting arrangement of the power chassis is indicated by the fragmentary dotted-line showing 68 at the front-underneath end of the main housing.

To better illustrate the compactness and convenience of the end point detector device, it may be noted that it has an overall width of 14 inches, a height of 6 inches at the hood, and a depth of 14 inches.

It will be seen, therefore, that the various components are mounted in a conveniently portable unit that is comprised of three main assembly units, permitting ready disassembly for purposes of maintenance or repair, with all of the control equipment being located on the top wall of the unit, and with the sample cell 13 being removable through the upper panel 54 of the hood 53. This upper panel of the hood is also removable for convenient access to the optical system, the most critical and sensitive section of the assembly. For a description and illustration of more of the details of the mounting arrangement and connection of the instrument, as well as a fuller explanation of the setup and operating procedures, reference may be had to the Instruction Manual for Central Scientific Company, Catalog No. 20925 (Color Matic End Point Device), the disclosure of which is specifically incorporated herein by reference.

Certain novel features of the mechanical construction and arrangement of the parts of the optical system are shown in detail in FIGS. 2 and 3. It will be apparent that the upper panel 54 of the hood, in conjunction with the novel beaker cover assembly 70, excludes stray light from the optical system. The cover assembly includes a shell-like member 71 in telescoping relation around the upper end of the beaker and having an internal annular lip 72 in which a large grommet 73 is confined in gripping engagement with the beaker to hold the shell tightly in place so that it may function as a splash well. The shell is arranged to receive a cover lid 74 having a depending marginal lip 74L, with the cover lid having several gasketed openings for mounting or supporting the delivery tube 14 and such accessories as a thermometer 75, immersion heater (not shown) and thermoregulator (not shown). This cover arrangement has the advantage that the instrument, as sold, has no projecting thermometer arms or supply tubes, such items being mounted in the lid and projecting from the instrument only during actual use.

The indexing arrangement for the numerous filters makes advantageous use of a turret assembly 77 which is simple in selection and adjustment and which accommodates a maximum number of filters within a given mounting space. As is apparent, the turret assembly houses and encloses the photo-sensitive detector 25, and it includes the stationary ring 58 carried on the optical chassis base plate 56 and a turret shell 78 of inverted cup-like form that is mounted in telescoping rotatable relation on this ring, with the shell having a plurality of filters 24 in concentric peripheral arrangement thereon. Indexing is accomplished by three ball-and-detent devices 79 which are arranged in equal, angularly spaced relation about the axial center line of the stationary ring, with two of these devices being located below the plane of a ring of detents 81 for the purpose of centering the turret shell with the third ball and detent device being in the plane of the detents for selectively engaging the same. The turret shell carries an operating shaft 82 that projects through the upper panel of the hood for connection to the operating knob 25K and the last mentioned ball and detent device is engageable for fixing the turret shell 78 relative to its support ring 58 with any selected filter in operative alignment with the light beam of the optical system. This turret assembly permits of convenient and accurate adjustment and selection of the desired filter and accommodates many filters, in this case eight, in a small space.

It should be understood that the description of the preferred form of the invention is for the purpose of complying with section 112, Title 35, of the U.S. Code.

We claim:

1. In apparatus for measuring and indicating the volume of reagent added to a sample solution to bring the sample to an end point condition, said apparatus including a cell for said sample, photometric means for detecting color changes of the sample solution, said photometric means including a source of light and a photo-sensitive detector subject to said light after passage through said sample solution, automatic means for progressively supplying a determinable amount of reagent to said cell, and electric circuit means connected to said detector and responsive to changes in the electrical condition thereof in reacting to predetermined absorption changes of said sample solution, the improvement wherein said electric circuit means includes a meter having an indicating arm movable proportionally to changes in the electrical condition of said detector, and means including a relay connected to control said supplying means and adjustable to respond when said circuit means produces a preselected movement of said arm for shutting off supply of reagent to said cell when an arbitrary absorption change occurs in said sample solution.

2. In apparatus for measuring and indicating the volume of reagent added to a sample solution to bring the sample to an end point condition, said apparatus comprising a cell for said sample solution, photometric means for detecting color changes of the sample solution, said photometric means including a source of light and a photo-sensitive detector subject to said light after passage through said sample solution, automatic means for progressively supplying a determinable amount of reagent to said cell, first electric circuit means connected to said detector and responsive to changes in the electrical condition thereof in reacting to changes in the absorbance of said sample solution, the improvement wherein said electric circuit means includes a combination meter relay having an externally visible contact arm movable proportionally to changes in the electric condition of said detector and an externally visible, manually adjustable stationary contact arm cooperating with said movable arm for engagement therewith in response to an arbitrarily selected absorption change in said sample solution, and second circuit means connected to said contact arms and responsive to contacting engagement therebetween for shutting off the supply of reagent to said cell when said same arbitrary absorption change occurs in said sample solution.

3. The apparatus of claim 2 wherein said first electric circuit means is connected with said detector to form a Wheatstone bridge arrangement wherein said detector determines the impedance in one arm of the bridge arrangement and said meter relay is bridged between null points in said arrangement and responds when said detector causes unbalance of said arrangement in response to color changes in said sample.

4. The apparatus of claim 2 wherein said photometric means includes means for providing an adjustable aperture in the light path between said source and said detector and wherein said first electric circuit means includes an adjustable impedance path that is adjustable for conforming the electrical characteristics of the first electric circuit means to the optical characteristics of the photometric means to adapt the apparatus for use with various types of sample solutions.

5. The apparatus of claim 4 wherein said photometric means includes a plurality of light filters selectively disposable in the light path between said source and said detector, each of said light filters having a different characteristic transmittance for use with samples having various different types of transmittance characteristics.

6. A method for determining the amount of reagent required to react quantitatively with a given volume of unknown liquid sample solution to bring the reaction to a true stoichiometric equivalence point, said method comprising performing a first titration comprising adding said given volume of sample solution to a sample cell, progressively adding reagent to the cell for reaction with said sample, photometrically detecting color changes of the liquid in the cell, and terminating addition of reagent to the cell at an end point at which the liquid in said cell undergoes a photometrically detectable change of color to establish an arbitrary end point which may be other than the stoichiometric equivalence point, then performing a second titration comprising adding an equal given volume of said sample solution to said cell, progressively adding reagent to the cell, and terminating the addition of reagent to said cell when photometric detection indicates said same arbitrary end point is reached, and measuring the amount of reagent added to the cell between the two arbitrary, identical end points as an indication of the amount of reagent required for bringing the original sample to a true stoichiometric equivalence point.

7. A method for determining the amount of reagent required to react quantitatively with a given aliquot of a solution of an unknown sample to bring the reaction to a true stoichiometric equivalence point, said method comprising adding to a reaction cell an aliquot of a solution of an unknown sample, carrying out a spectrophotometric titration to establish a reference end point, said titration including the steps of progressively adding reagent to said cell for reaction with said sample, photometrically detecting absorbance changes in the solution in said cell, and terminating the addition of reagent at an end point at which the solution in said cell undergoes a photometrically detectable absorption change to establish thereby an arbitrary end point which may be other than a stoichiometric end point; and then performing a second titration including the steps of adding to said reaction cell a known aliquot of the solution of said unknown sample, progressively adding reagent to said cell for reaction with said sample, photometrically detecting absorbance changes in the solution in said cell, terminating the addition of reagent when photometric detection indicates said same arbitrary end point is reached, and measuring the amount of reagent added to the reaction cell between two successive identical arbitrary end points as an indication of the amount of reagent required for bringing the known aliquot to a true stoichiometric equivalence point.

8. A method for determining the amount of reagent required to react quantitatively with a given aliquot of a solution of an unknown sample to bring the reaction to a true stoichiometric equivalence point, said method comprising adding to a reaction cell an aliquot of a solution of an unknown sample, carrying out a first titration to establish a reference end point, said titration including the steps of progressively supplying and mixing reagent with the sample in said cell for reaction with said sample, electrically detecting changes in the stoichiometric relationship between the reagent and the sample in said cell and terminating the supply of reagent at an end point at which the solution in said cell undergoes a detectable change in the stoichiometric relation between the sample and reagent to establish thereby an arbitrary end point which may be other than a true stoichiometric equivalence end point; and then performing a second titration including the steps of adding to the cell a known aliquot of the solution of said unknown sample, progressively supplying and mixing reagent with the last named aliquot in said cell for reaction therewith, correspondingly electrically detecting changes in the stoichiometric relation between the reagent and the aliquot in said cell, terminating the supply of reagent when detection of changes in said stoichiometric relationship indicates said same arbitrary end point is reached, and measuring the amount of reagent supplied between two successive identical arbitrary end points as an indication of the amount of reagent required for bringing the known aliquot to a true stoichiometric equivalence point.

9. A method for determining the amount of reagent required to react quantitatively with a given aliquot of a solution of an unknown sample to bring the reaction to a true stoichiometric equivalence point, said method comprising adding to a reaction cell an aliquot of a solution of an unknown sample, carrying out a spectrophotometric titration to establish a reference end point, said titration including the steps of progressively supplying and mixing reagent with the sample in said cell for reaction with said sample, photometrically detecting absorbance changes in the solution in said cell, and terminating the supply of reagent at an end point at which the solution in said cell undergoes a photometrically detectable absorption change to establish thereby an arbitrary end point which may be other than a stoichiometric end point; and then performing a second titration including the steps of adding to said reaction cell a known aliquot of the solution of said unknown sample, progressively supplying and mixing reagent with the last named aliquot of unknown sample in said cell for reaction therewith, photometrically detecting absorbance changes in the solution in said cell, terminating the supply of reagent when photometric detection indicates said same arbitrary end point is reached, and measuring the amount of reagent supplied between two successive identical arbitrary end points as an indication of the amount of reagent required for bringing the known aliquot to a true stoichiometric equivalence point.

10. In apparatus for measuring and indicating the volume of reagent added to a sample solution to bring the sample to an end point condition, said apparatus including a cell for said sample, automatic means for progressively supplying a determinable amount of reagent to said cell, detecting means responsive to changes in the stoichiometric relationship between said sample and said reagent in said cell, and electric circuit means connected to said detecting means and responsive to changes therein in reacting to predetermined changes in the stoichiometric relationship between said sample and said reagent, the improvement wherein said electric circuit means includes a meter having an indicating arm movable proportionally to said changes in said detection means, and means including a relay connected to control said supplying means and adjustable to respond when said electric circuit means produces a preselected movement of said arm for terminating supply of reagent to said cell when an arbitrary change in the stoichiometric relationship between said reagent and said sample occurs.

11. In apparatus for measuring and indicating the volume of reagent added to a sample solution to bring the sample to an end point condition, said apparatus including a cell for said sample, automatic means for progressively supplying a determinable amount of reagent to said cell, detecting means responsive to changes in the stoichiometric relationship between said sample and said reagent in said cell, and electric circuit means connected to said detecting means and responsive to changes therein in reacting to predetermined changes in the stoichiometric relationship between said sample and said reagent, the improvement wherein said electric circuit means includes a combination meter relay having an externally visible contact arm movable proportionally to changes in the detecting means, and an externally visible manually adjustable stationary contact arm cooperating with said movable arm for engagement therewith in response to an arbitrarily selected change in the stoichiometric relation between said reagent and said sample; and second electric circuit means connected to said contact arm and responsive to contacting engagement therebetween for terminating the supply of reagent to said cell when said same arbitrary change occurs between said reagent and said sample in said cell.

12. An apparatus for measuring and indicating the volume of reagent added to a sample solution to bring the sample to an end point condition, in combination, a cell for said sample, automatic means for progressively supplying a determinable amount of reagent to said cell, detecting means responsive to changes in the stoichiometric relationship between said sample and said reagent in said cell, and control means connected to said detecting means to respond to said changes and connected to control said supplying means, said control means being adjustable to respond when said detecting means produces a preselected change for terminating the supply of reagent when an arbitrary change in the stoichiometric relationship between said reagent and said sample occurs.

References Cited in the file of this patent

UNITED STATES PATENTS

| | | |
|---|---|---|
| 698,038 | Stewart | Apr. 8, 1902 |
| 777,609 | Deane | Dec. 13, 1904 |
| 2,424,858 | Senn | July 29, 1947 |
| 2,447,985 | Mass | Aug. 24, 1948 |
| 2,726,936 | Bernheim | Dec. 13, 1955 |
| 2,797,149 | Skeggs | June 25, 1957 |
| 2,898,200 | Karr | Aug. 4, 1959 |
| 2,950,178 | Halfter | Aug. 23, 1960 |

OTHER REFERENCES

Meites: Advanced Anal. Chem., 1958, pp. 287–291.

Goddu et al.: Anal. Chem., vol. 22, pp. 1314–1317.

Malmshadt: Anal. Chem., vol. 28, No. 9, 1956, pp. 1408–1412.

Lingane: Ibid, vol. 20, No. 4, Apr. 19, 1948, pages 282–292.